Sept. 15, 1931.   L. G. WINKLER ET AL   1,823,636
MOUNTING AND SUPPORT FOR REAR VIEW MIRRORS
Filed Feb. 16, 1929
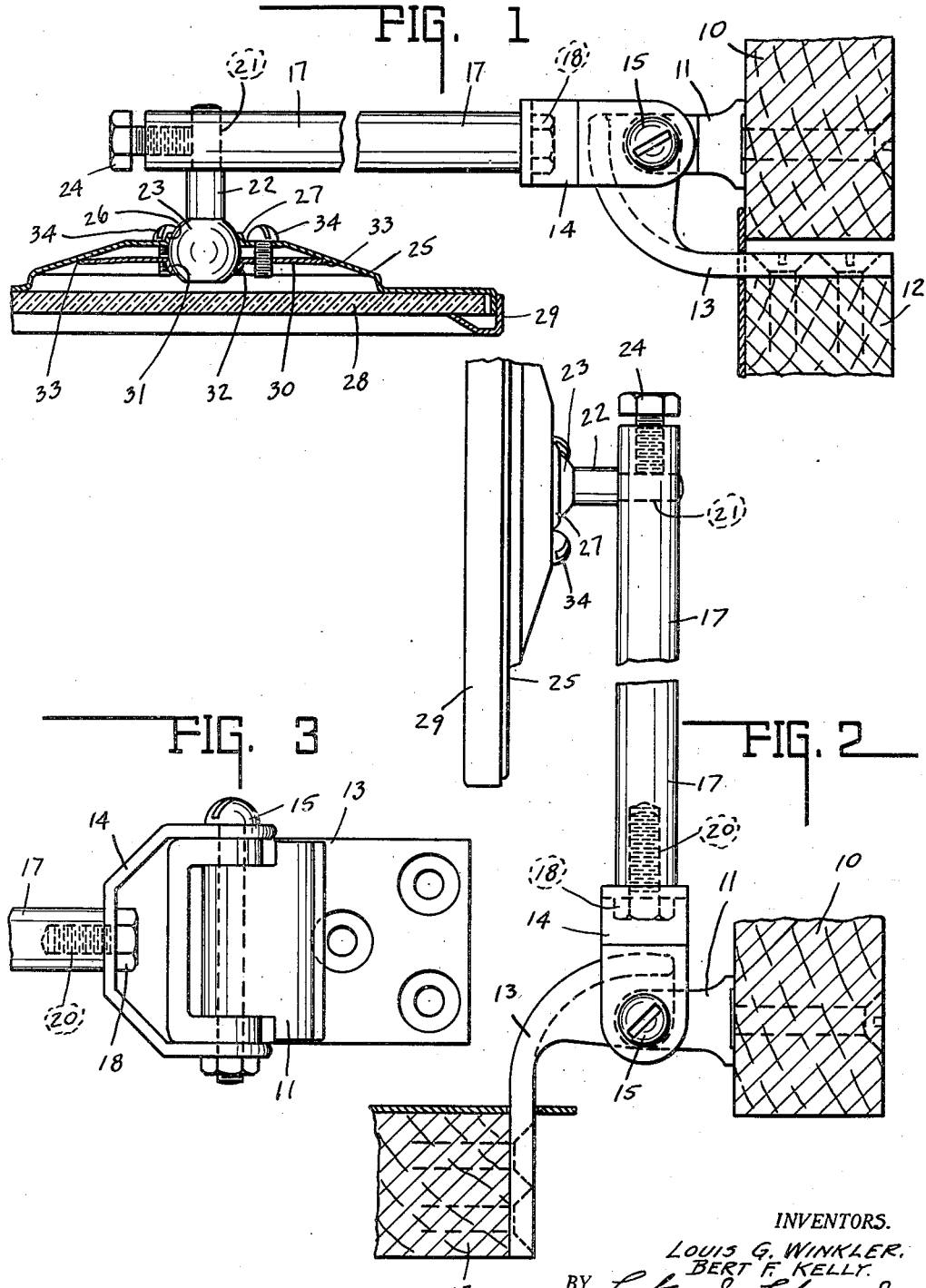
INVENTORS.
LOUIS G. WINKLER.
BERT F. KELLY.
BY
ATTORNEYS.

Patented Sept. 15, 1931

1,823,636

UNITED STATES PATENT OFFICE

LOUIS G. WINKLER AND BERT F. KELLY, OF INDIANAPOLIS, INDIANA

MOUNTING AND SUPPORT FOR REAR-VIEW MIRRORS

Application filed February 16, 1929. Serial No. 340,599.

This invention relates to a novel form of mounting mirrors and particularly the type of mirror used on an automobile for rear vision.

One object of the invention is to provide a mounting which is attachable to the door hinge of the automobile and requires no puncture of a fender or other part.

Another object of the invention is to provide an easily adjustable mounting which enables the mirror to be set at any angle and easily locked in place.

Another object of the invention is to provide a substantially dust-proof and water-proof ball and socket mounting.

Another object of the invention is to simplify the construction to provide inexpensive production.

The full nature of the invention will be understood from the accompanying drawing and the following description and claim.

In the drawing, Fig. 1 represents a plan view partly in section of a portion of the frame of a car, the door and hinge and a mirror mounted thereon, the door being closed. Fig. 2 is the same as Fig. 1, the door being opened. Fig. 3 represents an elevational view of the mounting on the door hinge.

Referring to the drawing, the car frame 10 supports a stationary hinge member 11 and the door 12 is supported by a movable hinge member 13 shaped in the form of a yoke fitting around the stationary member 11. A yoke 14 is fitted around the member 13 and is clamped thereto by means of a bolt 15 and nut 16. The bolt 15 therefore acts in the place of the usual hinge pin. A rod 17 is secured to the yoke 14 by means of the screw 18 passing through the yoke member and screwed tightly in the tapped hole 20 in one end of the rod. The rod can therefore be rotated to any desired position and held in place by tightening the screw. At the other end of the rod 17 is a transverse hole 21 through which is passed one end of the member 22 having at the opposite end an enlargement 23 in the shape of a ball. The member 22 is held in place by the set screw 24.

A pressed steel back plate 25 contains a hole 26 at its midpoint, of a diameter smaller than the diameter of the ball 23. The edges of this hole are flanged outwardly as shown at 27 and form a seat for the ball. A glass mirror 28 is carried in this back plate and held in place by the circular rim 29. Between the mirror and the back plate is a disk 30 having a hole 31 with flanged edges 32 similar to the hole 26 and flanged edges 27 of the back plate and forming an inner seat for the ball. The disk 30 is held in place against the back plate by screws 34 which pass through the back plate and are screwed into tapped holes in the seat disk. Only the edges of the disc contact with the back plate at 33, the remainder being spaced apart from the back plate.

The construction of this ball and socket joint is such that the screws 34 may be loosened, the mirror placed at any desired angle with respect to the ball and the screws again tightened to hold the mirror in the desired position. The disk 30 being spaced apart from the backing piece except at its outer edge, will be distorted by the tightening of the screws and will therefore, have a clamping action upon the ball which will provide a substantially dust-proof and water-proof joint. Likewise, the distortion of the back plate due to the screw tension will provide a second seal against the entrance of dust or water. If water or other foreign matter is allowed to collect in the back of the mirror, the chemical action set up usually results in the destruction of the mercury or other backing used on the mirror and consequently destroys the value of the mirror.

The distortion of the disc and back plate under spring tension also provides a lock nut action which prevents the screws jolting loose, and holds the mirror locked tightly in adjusted position.

The invention claimed is:

A mirror mounting including a support member having a substantially spherical portion, a backing member adapted to carry and embrace a mirror, said backing member engaging one side of said spherical portion and being shaped to provide a space between said backing member and said mirror into which said spherical portion extends, a plate housed by said backing member and positioned within said space for engaging the opposite side of said spherical portion, and screw fastenings connecting said member and plate for maintaining the same in clamping relation with said spherical portion.

In witness whereof, we have hereunto affixed our signatures.

LOUIS G. WINKLER.
BERT F. KELLY.